UNITED STATES PATENT OFFICE.

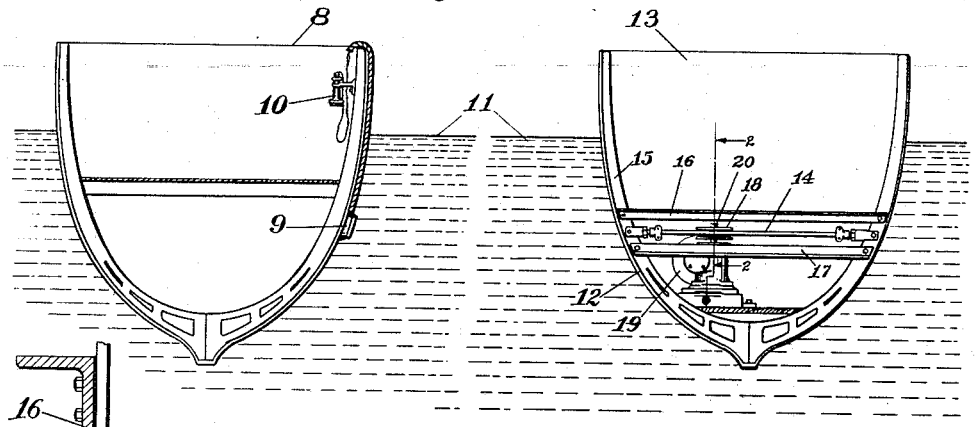
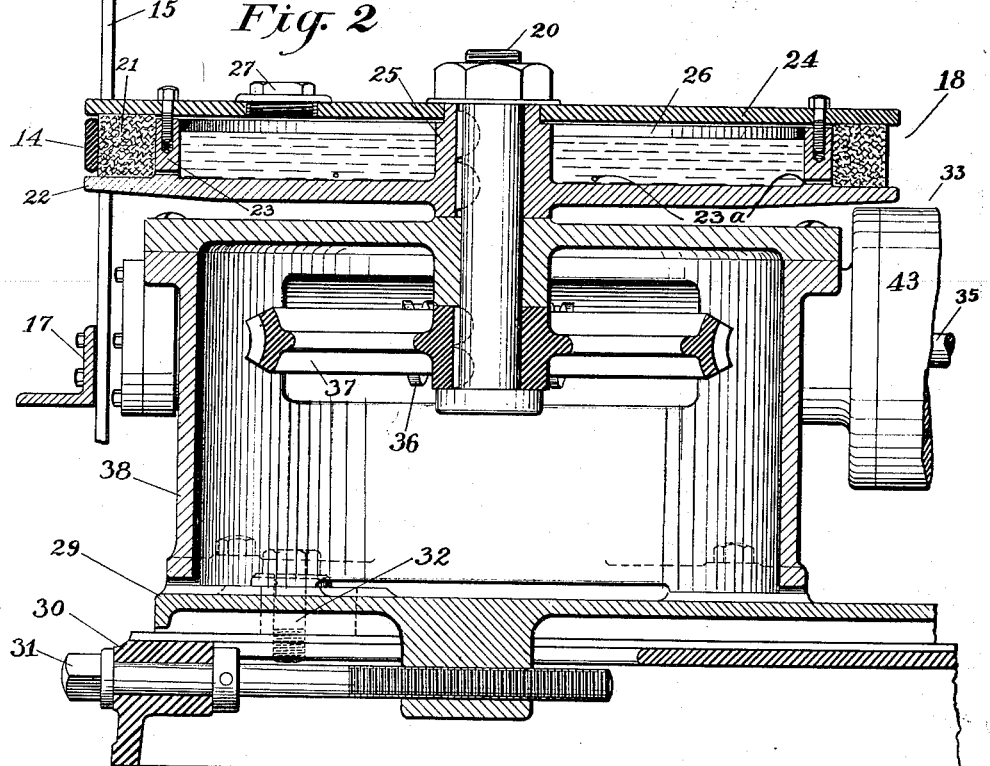

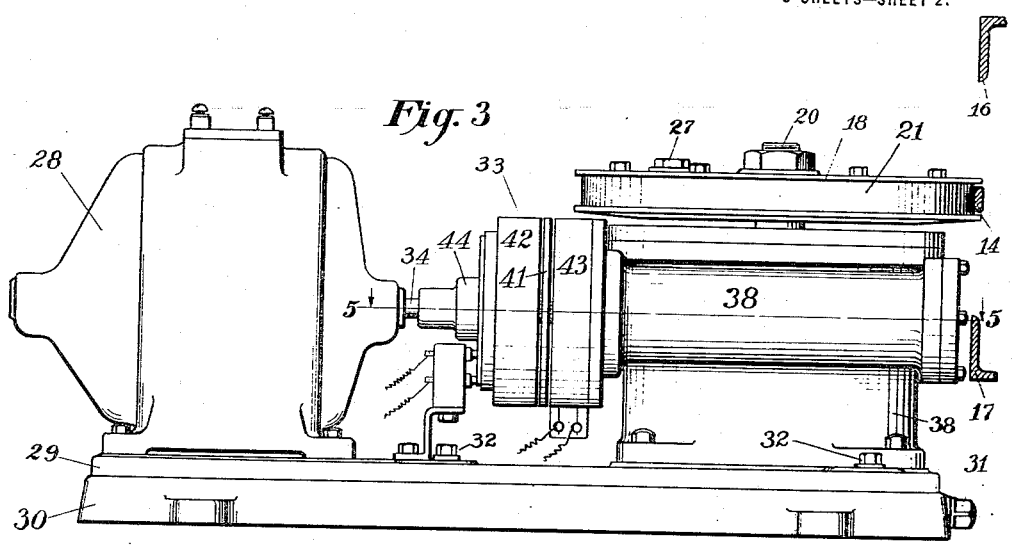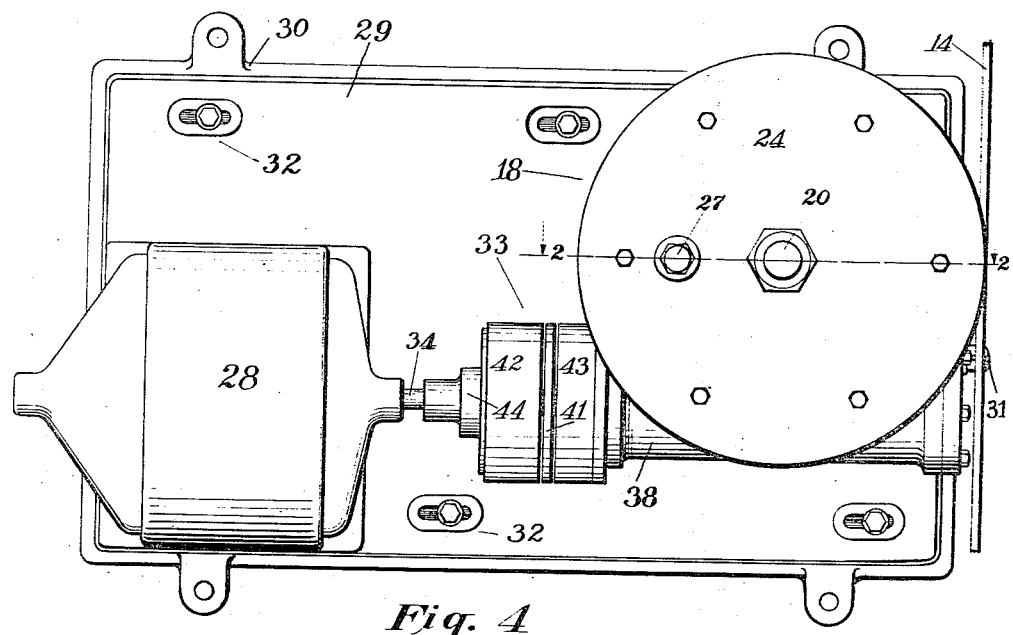

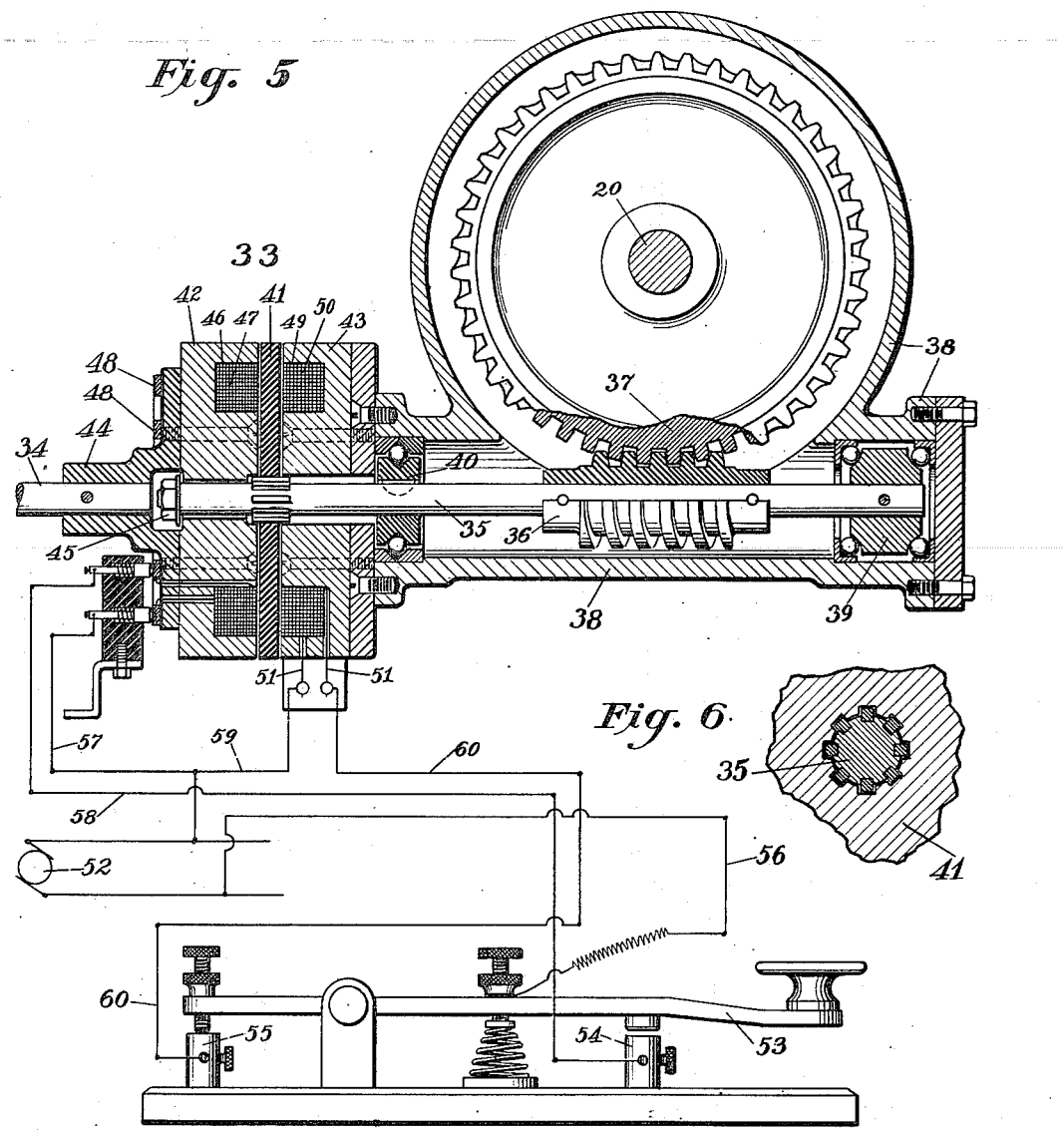

CHRISTIAN BERGER, OF NEW YORK, N. Y., ASSIGNOR TO SUBMARINE WIRELESS COMPANY, A CORPORATION OF NEW YORK.

SUBMARINE SIGNALING APPARATUS.

1,155,124. Specification of Letters Patent. Patented Sept. 28, 1915.

Application filed February 18, 1913. Serial No. 749,255.

*To all whom it may concern:*

Be it known that I, CHRISTIAN BERGER, a subject of the King of Hungary, residing at New York city, in the county of New York and State of New York, have invented certain new and useful Improvements in Submarine Signaling Apparatus, of which the following is a specification, reference being had therein to the accompanying drawing.

My invention relates to submarine signal sending apparatus, more particularly such as is adapted to be employed for the sending through water of signals in the form of sound vibrations from or to a floating vessel or the like.

One of the main objects hereof is to provide an apparatus that will satisfactorily and rapidly produce the dots and dashes of the Morse signal system or their equivalent, so that at a suitable receiving station the same may be received and translated into the words of a message.

It is a further object hereof to enable the production of such Morse signals or their equivalent by means of a sonorous body or vibrating member in which the impulses are originated that are to be transmitted through the water.

It is a further object hereof to enable the production of such signals through the use of such a member by means of an exciting device capable of throwing the member into full vibration at will, and of throwing it out of effective vibration at will, for example, by means of a controlling key or lever.

It is a further object hereof to provide in an apparatus of the kind a superior form of vibratable sonorous member whereon the signals are created.

It is a further object hereof to afford a superior exciting device or rubbing wheel for causing the sonorous vibrations in the vibrating member or strip, and a still further object is to afford a novel and efficient combination of a particular form of endwise-vibratable strip, and exciting wheel coöperating therewith.

Other objects and advantages hereof will be set forth in the specification hereof, or will be apparent to those skilled in the subject matter to which the invention pertains.

I will first describe one form of apparatus embodying the present improvements and will thereafter point out the novel features in the claims.

In the accompanying drawings forming a part hereof Figure 1 represents in cross section a pair of floating vessels one containing receiving apparatus and the other sending apparatus constructed in accordance with the present invention. It will be understood that in this and other figures many of the features are shown more or less diagrammatically, and necessarily exaggerated in some respects as to their dimensions for the purpose of clearness of illustration. Fig. 2 represents a longitudinal cross section taken upon the plane 2—2 of Figs. 1 or 4. Fig. 3 is a left hand side elevation of the apparatus shown in Figs. 1 and 2, illustrating the driving motor and connections. Fig. 4 is a top plan view of the apparatus shown in Fig. 3. Fig. 5 is a horizontal cross section taken on the plane 5—5 of Fig. 3, this figure also diagrammatically showing the electrical connections and in exaggerated scale a Morse key or lever for controlling the apparatus. Fig. 6 is a lateral cross section through the disk 41 and shaft 34, indicating the relation between these members.

Similar reference characters designate corresponding parts in the several figures of the drawing.

A receiving station or vessel 8 may have any sensitive device, as a microphone 9, connected to a receiver 10 at the ear of the receiving operator. The vessel 8, floating in the water 11, is at a distance from the sending station at which is the immersed plate or shell 12, constituting for example the side of a ship 13.

Before giving a specific description of the apparatus disclosed in the drawings, it may be preliminarily explained that as to one feature the present invention comprises a novel sonorous member in the form of an endwise vibratable strip. It also comprises, in combination with any vibratable member, the feature of an exciting device or wheel therefor having for driving the same a constantly rotating motor, preferably of high speed, with connections to the exciter for driving it at a comparatively low peripheral speed, and an intermediate device in the nature of a clutch by which the motor and exciter can be connected or disconnected at will; and preferably in connection therewith will be employed a speed reducing device such as a worm and wheel between the clutch and the exciter, so that the clutch whether in driving position or in braking position operates at the high speed end of the mechanism and therefore with maximum efficiency. In form the clutch referred to is preferably, as shown, of the electro-magnetic type having a revolving electromagnet and a stationary electromagnet, with a member or disk between them capable of being drawn toward one or the other under the influence of an operating key or switch so as to cause the rotation or stoppage of the disk, and a shaft which is connected thereto and which effects the driving of the exciter.

Another part of the invention may be said to consist of the novel exciter disclosed comprising a wheel, to the periphery of which is secured and clamped an annular rim, of material such as hair felt, for producing vibrations in a strip and means in connection with the wheel for maintaining the rubbing material moist with alcohol. Preferably, according hereto, the exciter or wheel is provided with a rotating periphery or exterior of a form, such as that of a cylinder, composed of straight line elements, and employed in coöperation with an endwise-vibrating rod or strip which has a flat side surface.

According to another feature hereof, this invention includes a novel mode of mounting in a ship an endwise-vibratable strip wherein the end of the strip is secured to the shell of the ship, and there is also secured to the shell of the ship, adjacent to said strip, at least one and preferably two rigid brace members substantially parallel to the strip so as to form a sort of polygonal frame across which the strip is stretched, such frame serving to hold the ship's shell to an appreciable and important degree against any tendency therein to create independent vibratory movements which would otherwise interfere with or destroy the sonorous signal vibrations of the strip.

*Description of drawings.*—In the open water shown at 11 is immersed a shell 12 which is, for example, the hull or a side plate of a floating vessel 13. The shell 12 is adapted to have operatively connected to it a longitudinally vibrating strip 14, adapted when excited to produce audible or musical tones by its own longitudinal vibration.

The strip 14 as shown is preferably of a cross section which provides a flat side, or two flat sides, for purposes that will hereinafter appear, and the connection between the strip 14 and the shell 12 may be a direct attachment of the strip to one of the usual metallic flanges 15, formed integrally with, and extending inwardly from, the ship's plates. In this way one abutment for the vibratable member is provided, and while an opposing abutment may be provided in various ways, I have for convenience illustrated it as consisting of the opposite side or shell of the vessel 12. Thus the strip 14 is shown extending substantially horizontally from side to side of the vessel.

While in some cases it would be operative and sufficiently effective to mount the strip in this simple way, yet, if the strip is of any substantial weight and under substantial tension as is desired, and when the vessel has thin or slight shell plates, there will be a conflict between the vibrations of the shell and the strip, which may even be destructive of any efficient signaling effect.

I therefore herein propose to combine with the strip 14 the shell 12 and the abutment opposing the same one, or preferably two comparatively strong and heavy cross pieces or irons, one of which 16 is shown above the strip and the other 17 below it, which pieces 16 and 17 are preferably parallel to each other and to the strip, so as to form substantially a four sided frame across which the vibratable strip is stretched. This I find effectually eliminates the independent vibratory action of the shell. It leaves it free to receive and transmit the vibrations of the strip so that the signals are properly sent out with maximum energy into the surrounding water.

It will be understood that the vibrations passing into the water travel horizontally to any distant receiving point such for example as a second ship 8, having any convenient type or form of sensitive device 9 for detecting the vibrations, and a device 10 whereby they are rendered audible or visible to the operator who is to interpret them into a message.

The stretched wire or strip 14 is to be excited by some exciting device such as a rubbing wheel operating through friction, and as before stated this preferably is arranged to excite the strip to vibrate longitudinally. While in some cases the excitation could be effected laterally, as with a violin bow and string, such arrangement would give a comparatively low pitch whereas I desire the very many times higher pitch afforded by the longitudinal vibration.

The location of the exciter or rubbing wheel 18 is shown in Fig. 1 and the preferred construction in Fig. 2. Below the wheel 18 in Fig. 1 is seen its operating mechanism 19, there being a vertical shaft 20 extending upwardly from the operating mechanism to the wheel.

Referring to the preferred details of the exciting wheel, it comprises, as shown in Fig. 2, a peripheral body of felt 21 which preferably is annular in shape so that the exciter can be rotated always in the same direction for effecting signal vibrations. The wheel 18 is shown as horizontally arranged and as having a circular base plate 22 extending upwardly from which is an annular flange 23, and on top is a removable cover 24 secured by screws to the flange 23; the base 22, the flange 23 and the cover 24 serving to confine the body of felt 21 on three sides, such felt contacting the strip 14 on its outer surface. The felt, it should be said, is preferably a fine quality of felt such as wool of sheep, and in a considerably compressed condition. The wheel 18 is shown as also having a hub part 25 between which and the flange 23 is inclosed a chamber 26 adapted to contain alcohol, there being a plug 27 at the upper side for filling and refilling the chamber. The purpose of this is that the alcohol passing gradually through and outwardly at the lower part of flange 23 keeps the body of hair felt constantly moist, thereby affording, as I have discovered, a most efficient sort of exciting action upon the sonorous strip. A series of communicating apertures 23ª between the alcohol chamber 26 and the body of felt 21 are shown in the flange 23.

Referring now to the mechanism for driving the exciting wheel 18, I have shown a constantly running motor 28 together with connecting mechanism of a nature permitting the sending of Morse signals without stopping and starting the motor. While starting and stopping the motor might, to an inefficient extent be employed for very slowly sending signals that could be interpreted, the mechanism hereof, working on other principles, is adapted to overcome the objections thereto. The present invention also is contrary to an apparatus where the vibration of the strip is intermittently effected by bringing the exciter into and out of contact with the strip, which would also be a slow and inefficient method. Contrary to such procedure, the present invention, according hereto, comprises a speed reducing gear between the motor and exciter and an intermittently acting clutch between the motor and the reducing gear whereby at proper intervals the exciter can be disconnected from the motor and braked without stopping the motor.

I shall now describe the details of the driving apparatus hereof. The drawings illustrate an adjustable table 29 which carries the motor 28 and exciting wheel 18. The table 29 rests upon a stationary base or bed 30. I prefer that the table shall be longitudinally adjustable on the bed, that is, toward the right and left in Figs. 2, 3 and 4, and slot and bolt devices 32 are shown. To effect such adjustment is shown a square ended adjusting screw 31, engaging the table by its threads and engaging the bed by its collars, so that turning the screw causes the adjustment of the table, which obviously may be guided in any desired manner as by dovetails along the bed.

Intermediate the motor 28 and the exciter 18 is shown a device 33 adapted to be clutched and unclutched for driving and for releasing and braking the exciter. Between the motor 28 and the clutch device 33 is the fast running motor shaft 34. Between the clutch 33 and the exciter is the fast running worm shaft 35 carrying the worm 36, which drives the worm wheel 37 carried on the vertical shaft 20, which also carries the exciter 18. By this arrangement, when the worm shaft 35 rotates with the motor shaft 34, the worm wheel and exciter will be driven at a comparatively low speed.

Surrounding the worm and wheel device is shown a casing 38, which also contains a bearing 39 for one end of the worm shaft 35 and a second bearing 40 at another part of said shaft. One of these bearings, preferably 39, will be a combined thrust and radial bearing.

Always rotatable with the worm shaft 35 but fitted to slide upon it through connecting teeth or grooves on the two, is a rotary disk 41 of magnetic metal, preferably of soft iron. This disk 41 takes part in the clutching and braking actions and preferably stands immediately between a rotary clutch member 42, to the left of it, and a stationary clutch member 43 to the right of it, as in Fig. 5. For rotating the clutch member 42 there may be a connecting piece 44, securing it to the motor shaft 34. The worm shaft 35, although it does not always rotate with the clutch member 42, may have nuts 45 at its left end between member 42 and piece 44.

In order to enable the clutch members 42 and 43 to be rendered magnetic or nonmagnetic at will, they may be provided with annular recesses 46 and 49 respectively, containing annularly arranged electrical coils 47 and 50 respectively, having exterior brushes 48, 48 or terminals 51, 51 respectively.

In order to produce electric currents in the coils 47 or 50, any convenient source 52 of current may be employed, controlled by a double acting key or lever 53 having a contact 54 for energizing the coil 47 to operate the exciter 18 and a contact 55 which is normally contacted, for energizing the coil 50 to cause the stoppage of the exciter.

According to the diagram of connections they may include a wire 56 extending from the source of current 52 to the key 53. When the key is depressed making contact at 54, the current will pass thence through wire 58 to one of the brushes 48 and thus through the coil 47 and out by the other brush 48, thence through the wire 57 back to the source 52 of current. When the key 53 is released and it returns to the normal position illustrated, the circuit is from the key to contact 55 through wire 60 to one of the terminals 51, thence through the coil 50 and out by the other terminal 51 and thence by wire 59 back to the source 52 of current.

The controlling operation of the key 53, assuming the motor 28 to be constantly running at high speed, will be as follows: Normally the disk 41 will be held by magnetism in face contact with the stationary member 43. In fact, a slight space is shown for clearness of illustration, but in practice the entire play of the disk will be extremely slight. Normally, however, as stated, the disk will be stationary and therefore the worm and wheel and the exciting wheel 18, and the latter being always in contact with the strip precludes it from vibration. On depressing the key 53 the current will be shut off from the clutch member 43, which will thereupon substantially lose its magnetism. There may, however, be a residual magnetism in the member 43 and in the disk 41, of a kind determined by the direction of rotation of the magnetic lines of force. I prefer to so arrange and connect the wiring of the coils 47 and 50 that the same circular direction of magnetic lines will be produced in each so that any residual magnetism in the disk 41 after the operation of one coil will be neutralized or destroyed by the subsequent action of the other coil. The current being thrown into the coil 47 of the rapidly rotating clutch member 42, said member becomes highly magnetic and the soft iron disk 41 is thereby strongly attracted and drawn across the brief space between the two clutch members so as to be tightly held in face contact with the rotating clutch member.

The gripping magnetic force and the face friction are sufficient to compel the disk to rotate with the clutch member, and the disk carries with it the worm shaft 35 so as to drive the exciter at the required speed. The action, moreover, is so effective that the full rotation of the parts is secured practically instantaneously upon the depression of the key, so that it may be said that as long as the key is depressed the sonorous strip 14 is operatively excited to send out signal vibrations. On the contrary, the moment the key 53 is released the powerful magnetic action of the stationary clutch member 43 immediately neutralizes any residual magnetism and at once compels the disk 41 and its connected parts to come to a complete stop. Thus the excitation of the sonorous strip is stopped, and not only that but the damping action of the retarded exciting wheel at once puts a stop to the operative vibrations existing in the strip 14.

Having thus completely described the parts of an apparatus embodying my improvements, I will make further descriptive elaboration that will more clearly indicate the mode of practising the improvements.

The lengthwise-vibratable sonorous member, strip or rod, 14, is *per se* an important feature in securing practical and efficient results in an apparatus of the kind in discussion. The differences between such strip and a laterally vibratable strip are more than differences in degree. Frequency to the extent of thousands of vibrations per second rather than hundreds is attainable, which I find is extremely important for the reason that the high vibrations are not only transmissible through the water with greater efficiency and energy but are much less influenced or impaired by accidental surrounding conditions. The vibration, if endwise, consists of longitudinal pulsations which pass endwise from the strip into and through the metal of the shell 12 and thence into the water, all without change of direction and therefore without the losses that would occur by the conversion of lateral vibration into longitudinal pulses. The high pitch pertaining to the longitudinally vibrating strip enables me to employ in a receiving apparatus a peculiarly delicate form of sensitive device answering to high vibrations of extremely small amplitude. I find that apparently it is even unnecessary that at the receiving point the pulsations should be molecular in character, since a practically molecular vibration or pulse will be satisfactorily received and rendered sensible by the microphone. The strip 14 substantially constitutes an instrument or machine for producing or controlling the energetic pulses which are to constitute the signals, and the strip is shown laid in a direction substantially normal to the immersed surface of the shell to which it is operatively connected, which ordinarily involves a horizontal arrangement of the strip. In order to secure maximum efficiency, I prefer to locate the exciter at a point approximately one-third of the strip's length from the end thereof as shown in Fig. 1, and I prefer that the exciter consist of a wheel as shown, so that it may rub in one direction only.

The pair of rigid braces 16 and 17 constituting a means for confining the shell 12 against independent or interfering vibration therein, is of importance because actually permitting greater effectiveness and energy to be thrown into the signals. A comparatively movable abutment for the sonorous member would materially injure its action, while the effect of the braces or stays, confining the shell against interference, insures maximum action. I have found, in fact, that with vessels having comparatively light thin shells, such as torpedo vessels, the thinness and independent action of the shell constituted a material obstruction and that this was overcome by the improvement in discussion. By employing the present combination including the braces or stays, a considerably larger and heavier strip is enabled to be employed, and therefore proportionately greater energy is enabled to be thrown into the vibrations, so that in fact a larger range of signaling is possible with light shelled boats.

I have successfully employed a substantially oblong sectioned strip of one-half inch in width and fifty-two thousandths inch in thickness.

A substantial portion of the present improvement is the combination of such flat sided sonorous strip with an exciter having a surface such as a cylindrical surface composed of substantially straight elements. Such a rubbing surface is more easily produced and maintained. It affords a large rubbing surface as between it and the strip, thereby greater rubbing friction is secured and far more energy is put into the endwise vibrations. The pressure between the strip and wheel may thereby be somewhat reduced and less wear is caused, not only by reduced pressure but by the better distribution of the pressure over the rubbing surface, and greater life and durability is thereby attained.

The horizontal position of the rubbing wheel and its simplicity of construction and ease of maintenance, and the interior liquid supply for the rubbing surface, all coöperate to render the exciting wheel superior and more satisfactory in practice. The use of compressed hair felt is also of value in this connection.

I hereinbefore referred to the adjustment of the exciter in a direction toward and from the strip and the importance of this is considerable. It not merely permits the backing up of the wheel for the removal thereof or replacement of parts, but it permits an adjustment of pressure as between the wheel and strip. I have found by tests that the appropriate rubbing velocity, under any given conditions, is a function of the pressure between the parts. It is convenient to adopt a moderate velocity and to then adapt the pressure thereto. For example, I have found that a peripheral velocity of the exciter of three feet per second is satisfactory for a strip of the dimensions before stated. The pressure then between the exciter and strip will be substantial or considerable, and is easily determined in the practice of the present improvement by trial. The exciting wheel will be continuously rotated at the determined speed stated and the pressure thereupon varied by the adjustment of the wheel in a direction toward or from the strip until a maximum sonorous effect is attained. When this point is determined the adjustment will be suitably secured and thereupon signals may be sent with the desired effectiveness.

I have discovered that when dot and dash signals are being sent through intermittent operation of the strip, a slightly lower peripheral speed is desirable than would be suitable for continuous operation of the strip; and I further find that this need is automatically taken care of in the disclosed apparatus hereof, for the reason that the motor when under the influence of the intermittent action is slightly reduced in average speed. Thereby the proper pressure adjustment for sending dot and dash signals is properly determined under conditions of continuous vibration.

Since obviously it is desirable to secure maximum energy of vibration, it is generally speaking desirable to employ both high rubbing speed and high pressure between the exciter and strip. Practically, however, I find that there is a limit to both pressure and speed. With too high speed the vibratory action from the rubbing is reduced, because the rubbing material is unable to secure a proper grip upon the strip. The limit thus imposed on speed also precludes the employment of excessive pressure. A practical limit is also imposed by the destructive wear upon the exciter from too high a speed or pressure, and excessive pressure would also prevent the maintenance of alcohol or other liquid in the pervious rubbing surface. For these reasons I select the moderate surface speed before referred to and adjust the pressure thereto.

In the driving mechanism for the exciter there are several features of importance. I prefer that the high speed motor 28 shall be an electric motor operating at, for example, fourteen hundred revolutions per minute, while the exciter will be of such dimension that a revolution at the rate of sixty per minute will give the desired surface speed. With such ratio and proper reducing gear, greater steadiness of action is secured and minimum variation. I have heretofore referred to the advantages of maintaining the motor constantly running and of maintaining the exciter in constant contact with the strip rather than the contrary of either of these, and the employment of an intermediate clutch-and-brake located in the train of mechanism between the reducing gear and the motor. An electro-magnetic clutch for this purpose gives instant control and enables high sending speed of signals or words. The combination and arrangement shown permits the parts which have to be thrown into and out of action to be constructed of light weight with small momentum, thereby facilitating the desired abrupt starting and stopping, and with the stopping the braking, of the strip's vibrations.

It will thus be seen that I have described a complete apparatus accomplishing the objects and possessing the advantages before stated, as well as other advantages that will be apparent to those skilled in submarine signaling.

What I claim is:

1. A submarine signal sending apparatus including in combination an immersed plate or shell adapted to be vibrated from the interior to transfer the vibrations to the surrounding water, an elongated vibratable sonorous member connected to said shell at the interior side thereof, a plurality of cross braces connected to said shell and spaced apart with said member between them, whereby the shell is braced and is confined against interfering with the vibrations, and means for longitudinally vibrating said member.

2. A submarine signal sending apparatus including in combination with an immersed plate or shell, an elongated longitudinally vibratable member connected to said shell, and a rubbing device therefor constructed with a pervious surface which is moistened and cushioned.

3. A submarine signal sending apparatus including in combination with an immersed plate or shell, an elongated longitudinally vibratable member connected to said shell, and a rubbing device therefor constructed with an annular body of pervious elastic fabric and means for moistening the same.

4. A submarine signal sending apparatus including in combination with an immersed plate or shell, an elongated longitudinally vibratable member connected to said shell, and an exciting wheel therefor constructed with a body, an annular piece of rubbing material thereon, and a detachable side plate for securing the whole together.

5. A submarine signal sending apparatus including in combination with an immersed plate or shell, an elongated longitudinally vibratable member connected to said shell, and a rotary exciting wheel therefor constructed with a chambered body and directly tangentially contacting said member, an annular piece of rubbing material thereon, and a detachable side plate for securing the whole together there being liquid passages from the chamber in said body to said rubbing material for keeping the latter moist.

6. A submarine signal sending apparatus including in combination with an immersed plate or shell, an elongated longitudinally vibratable member connected to said shell, and an exciting wheel therefor constructed with a body, an annular piece of compressed hair felt thereon, and a detachable side plate for securing the whole together.

7. A submarine signal sending apparatus including in combination with an immersed plate or shell, an elongated longitudinally vibratable member connected to said shell, and a rubbing device therefor constructed with a surface of compressed hair felt.

8. A submarine signal sending apparatus including in combination with an immersed plate or shell, an elongated longitudinally vibratable member connected to said shell, and a rubbing device therefor constructed with a surface of compressed hair felt, and means for maintaining said hair felt moist with alcohol or analogous liquid.

9. A submarine signal sending apparatus including in combination, a sonorously longitudinally vibratable strip having its own definite frequency and arranged to send into the water the vibrations arising therein, a rotary exciting wheel arranged tangentially to the strip, and in constant contact therewith whether in or out of operation, and mechanism for operating said wheel intermittently to produce controlled interrupted excitations of said strip, comprising a constantly running motor, an electro-magnetic clutch member rotating with said motor, a shaft from which said exciter is driven, an iron disk rotatable with said shaft adjacent said rotating clutch member, a non-rotating electro-magnetic clutch member oppositely adjacent said disk, and electric control means for energizing one or the other clutch member for starting or stopping said disk, shaft and exciter.

10. A submarine signal sending apparatus including in combination, a sonorously longitudinally vibratable strip having its own definite frequency and arranged to send into the water the vibrations arising therein, a rotary exciting wheel arranged tangentially to the strip, and in constant contact therewith whether in or out of operation, and mechanism for operating said wheel intermittently to produce controlled interrupted excitations of said strip, comprising a constantly running motor, an electro-magnetic clutch member rotating with said motor, a shaft from which said exciter is driven, an iron disk rotatable with said shaft adjacent said rotating clutch member, a non-rotating electro-magnetic clutch member oppositely adjacent said disk, and electric control means for energizing one or the other clutch member for starting or stopping said disk, shaft and exciter; said clutch members being electrically wound and connected to produce opposite magnetic lines in said disk whereby when operated each member destroys the residual magnetism therein.

11. A submarine signal sending apparatus including in combination, a sonorously longitudinally vibratable strip having its own definite frequency and arranged to send into the water the longitudinal vibrations arising therein, an exciter adapted when in operation to produce a steady rubbing action lengthwise upon the strip so as to excite sonorous longitudinal vibrations therein of such definite frequency, a constantly operating source of power adapted to intermittently drive said exciter, and controlling means adapted to bring about rapid consecutive operations and interruptions of the operation of said exciter, whereby suitable sonorous signals of a definite pitch may be produced; said controlling means including a device for effecting the instantaneous stopping of the operative action of the exciter when the operative drive thereof is discontinued.

12. A submarine signal sending apparatus including in combination, a sonorously longitudinally vibratable strip having its own definite frequency and arranged to send into the water the longitudinal vibrations arising therein, a tangentially arranged rotary exciting wheel adapted when in operation to produce a steady rubbing action lengthwise upon the strip so as to excite sonorous longitudinal vibrations therein of such definite frequency, fittings for holding said wheel in constant contact with said strip whether in or out of operation, a constantly operating source of power adapted to drive said exciting wheel, connections between said source of power and said wheel adapted to be connected and interrupted, means for instantaneously stopping the operative rotation of the wheel when disconnected from the source of power, and controlling means adapted to bring about rapid consecutive connection and interruption of said connections, whereby suitable sonorous signals of a definite pitch may be produced.

13. A submarine signal sending apparatus including in combination, a sonorously longitudinally vibratable strip having its own definite frequency and arranged to send into the water the longitudinal vibrations arising therein, an exciter adapted when in operation to produce a steady rubbing action lengthwise upon the strip so as to excite sonorous longitudinal vibrations therein of such definite frequency, a constantly running high speed motor, adapted to drive said exciter, a reducing gear between motor and exciter, a quick-action clutch-and-brake device between motor and reducing gear, and controlling means for said device, whereby suitable sonorous signals of a definite pitch may be produced.

In testimony whereof I have affixed my signature in presence of two witnesses.

CHRISTIAN BERGER.

Witnesses:
  JOHN M. RUSSELL,
  W. R. KENNEDY.